Jan. 25, 1966  K. BLANZ  3,230,925
CONTROLLED PATTERN CUTTING AND MARKING
Filed Nov. 27, 1962  7 Sheets-Sheet 1

*Inventor:*
Kurt Blanz
Nolte & Nolte
attorneys.

Jan. 25, 1966 K. BLANZ 3,230,925
CONTROLLED PATTERN CUTTING AND MARKING
Filed Nov. 27, 1962 7 Sheets-Sheet 2

Jan. 25, 1966  K. BLANZ  3,230,925
CONTROLLED PATTERN CUTTING AND MARKING
Filed Nov. 27, 1962  7 Sheets-Sheet 3

Inventor:
Kurt Blanz
Nolte & Nolte
attorneys.

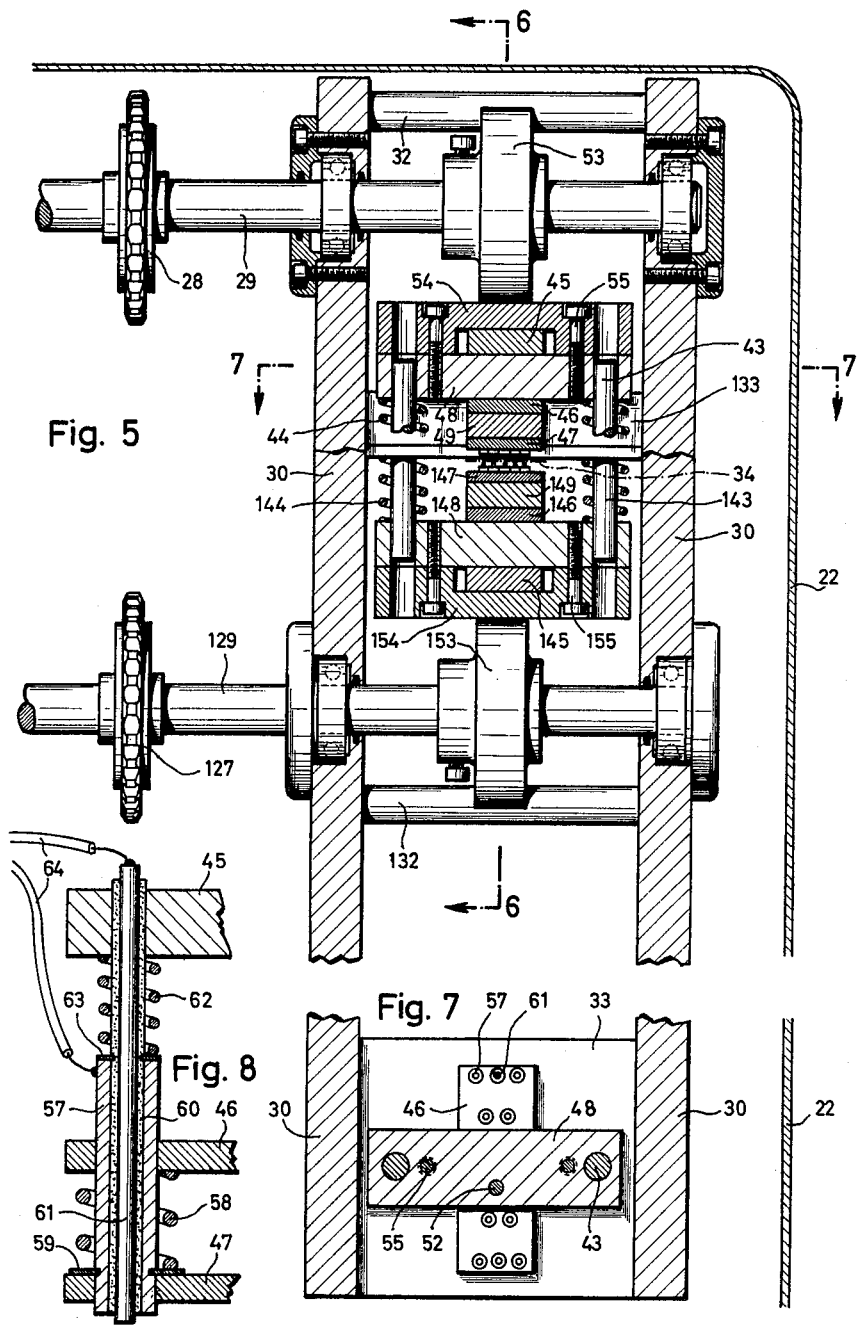

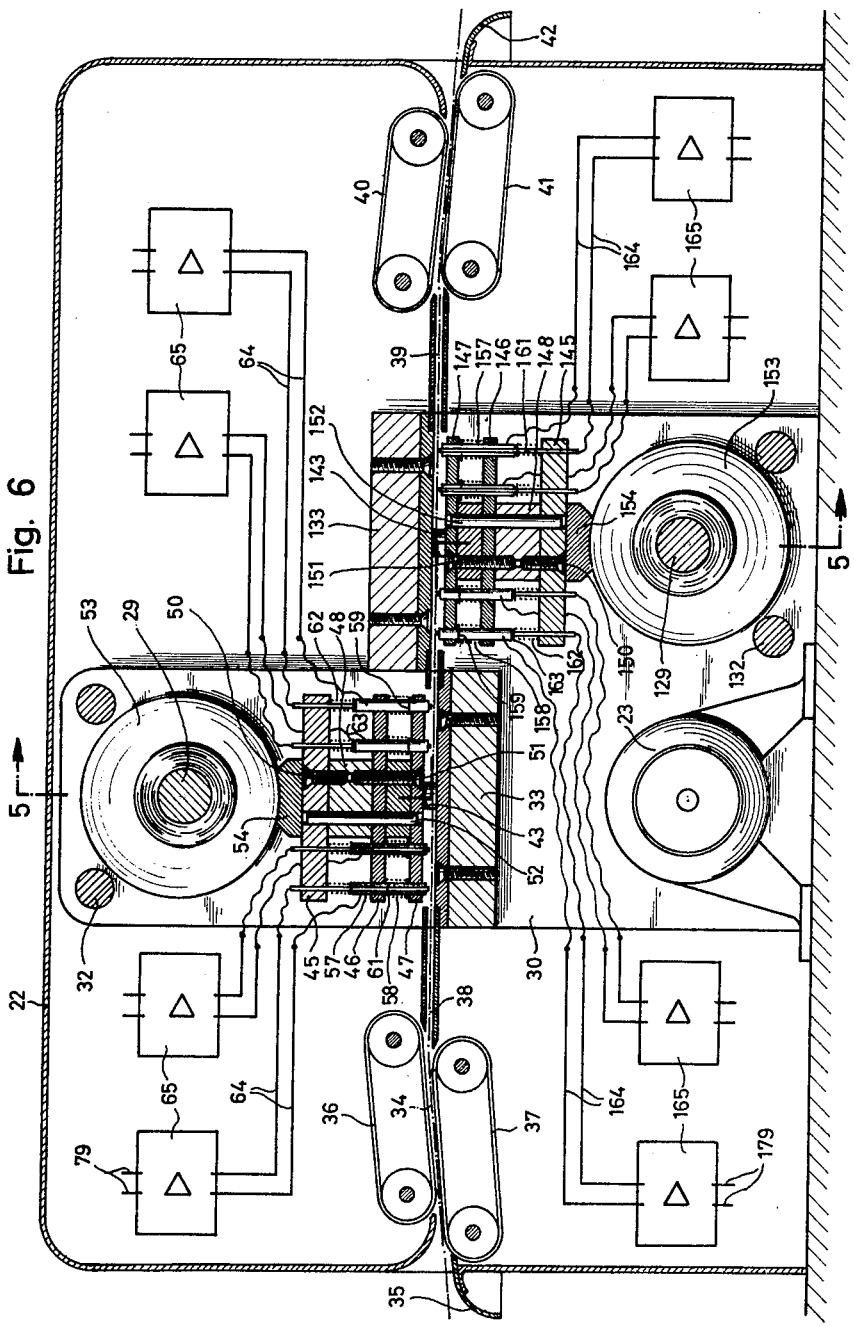

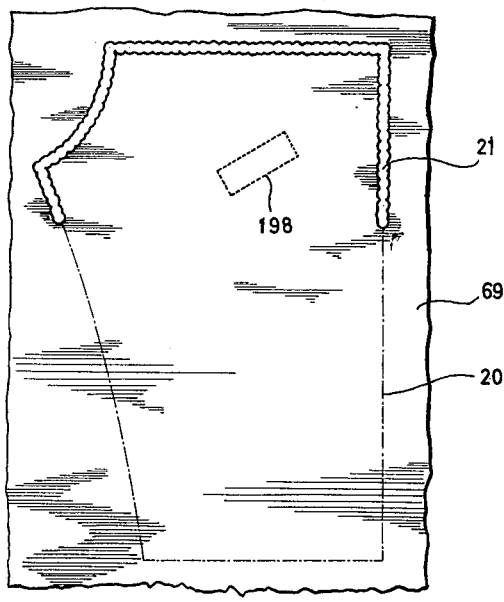
Fig. 9
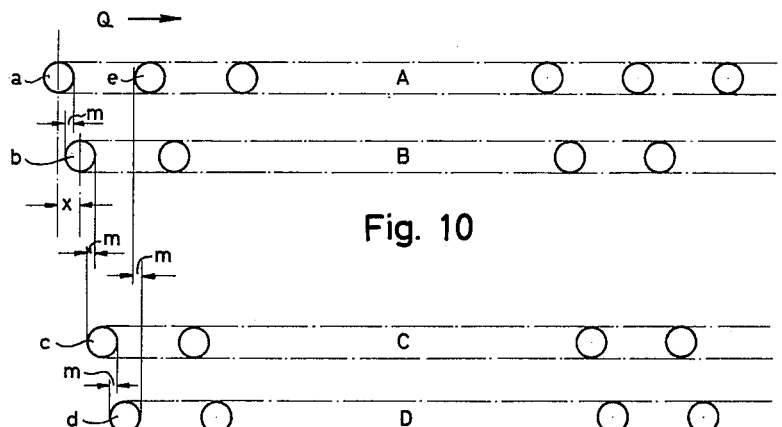
Fig. 10
Fig. 11
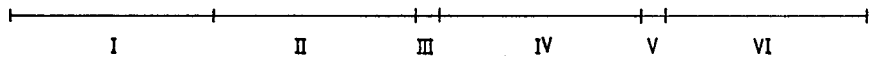

3,230,925
CONTROLLED PATTERN CUTTING
AND MARKING
Kurt Blanz, Stuttgart, Germany, assignor to Krauss &
Reichert, Spezialmaschinenfabrik und Apparatebau,
Fellbach, near Stuttgart, Germany
Filed Nov. 27, 1962, Ser. No. 240,225
Claims priority, application Germany, Nov. 28, 1961,
K 45,304
4 Claims. (Cl. 118—7)

This invention relates to an improvement in textile cutting machines, whereby simultaneously with the automatic cutting of pre-selected patterns also a variety of markings may be applied to the fabric.

This invention is an improvement of the device disclosed and claimed in U.S. Letters Patent No. 3,021,999 by the same inventor and assigned to the same assignee.

In many textile-cutting operations, where pre-cut patterns are subsequently sewn together into garments, or the like, markings for the tailor have been applied to the cut-out patterns subsequent to the cutting operation. In the prior art, such markings were applied manually or by machine by means of masking, spraying or other means.

It is an object of the present invention to provide an improvement in textile cutting machines, more particularly in a machine of the nature of the above-identified patent, whereby predetermined markings can be applied onto a web material simultaneously with the cutting-out of a pattern from said web.

It is another object of the invention to provide an improved automatic textile cutting device having a capability for automatically applying markings onto the textile to be cut.

The textile-cutting machine of U.S. Letters Patent No. 3,021,999 includes a plurality of strategically placed sensor elements capable of detecting a bracing on a template, the outlines of the tracing corresponding to the outline of the pattern to be cut from a layer or number of stocked layers of textile web material. The template is indexed past a series of sensors and the textile web is simultaneously indexed past a set of punches, strategically located similar to the disposition of the sensor elements. As a sensor element detects a portion of the tracing on the template passing by it, the sensor actuates a correspondingly located punch, which thereupon punches a hole in the textile web. The strategically located punches, each actuated by a corresponding sensor element, punch the pattern out from the web by means of a series of overlapping punch-holes, thus separating or cutting out the pattern from the web.

In accordance with the present invention, an additional set of sensing elements is provided for the present purpose, each additional sensing element being related to a marking nozzle. The marking nozzles are adapted to apply a marking to the pattern at locations thereof determined by another set of tracings on the template, the marking being applied by means of a liquid or powder marking medium. Valves, controlling the flow of the marking medium through the nozzles, are actuated similar to the actuation of the punches in the above-mentioned patent.

Further features and advantages are to be discussed in the following detailed disclosure, with reference to the appended drawing.

Referring now to the drawing, showing a preferred embodiment of the invention, wherein like numbers refer to like parts throughout:

FIG. 5 is a longitudinal section through the scanning or sensing portion of the machine, taken along the line 5—5 of FIG. 6;

FIG. 6 is a transverse section through the scanning or sensing portion of the machine, taken along the line 6—6 of FIG. 5;

FIG. 7 is a fragmentary horizontal transverse section through a part of the scanning portion of the machine, taken along the line 7—7 of FIG. 5;

FIG. 8 is an enlarged scale longitudinal section through a part of the scanning section, showing a scanning means of the machine;

FIG. 9 is a top plan view of a textile fabric web indicating thereon a pattern to be cut thereof and a portion thereof which has been cut by perforations made by the punching portion of the machine, also showing a marking applied by the marking portion.

FIG. 10 is a somewhat schematic diagram showing the distribution of the sensors and the punches of the sensing and punching portions of the machine; and FIG. 11 is a diagrammatic showing of the different working phases which occur during each revolution of the main drive shaft of the machine.

Figure 1:
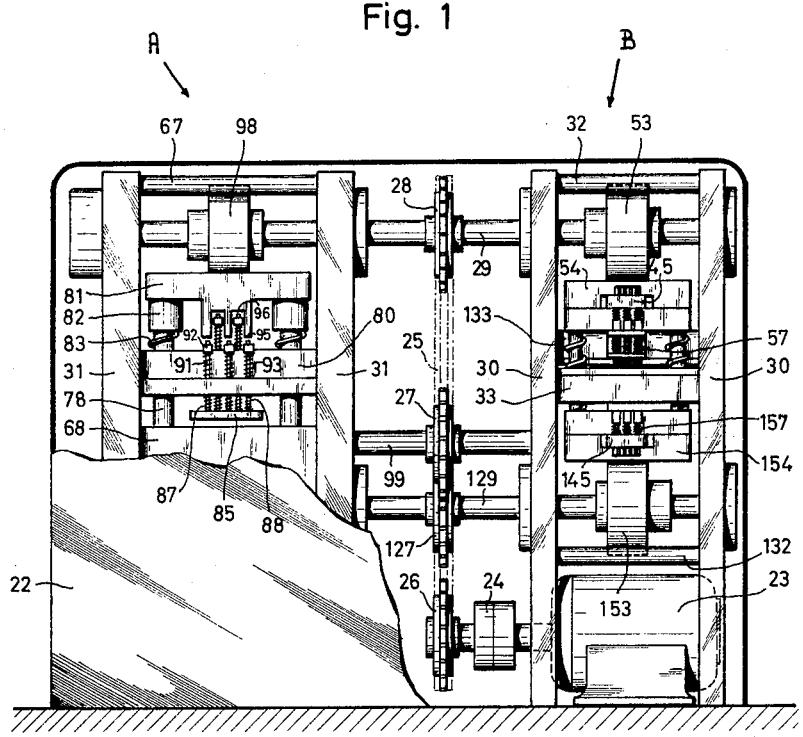
FIG. 1 is a front elevation, partly broken away, of a pattern-cutting machine constructed in accordance with the invention.

The embodiment of the textile-cutting machine by means of which the invention is illustrated is identical to the preferred embodiment of the invention shown by the above referred to Patent No. 3,021,999, wherein the principal operating parts of the machine comprise a punching and masking portion generally designated A, having means for indexing a web 69 of textile fabric in association with a plurality of reciprocating punch members, which are individually actuated under the control of sensing devices located in a sensing or scanning portion of the machine, generally designated B (FIG. 1). In the present invention, the punching portion also includes means for selectively applying markings to the web 69. The scanning portion B includes means for indexing a template 34, bearing a trace of the pattern to be cut out from the web 69 and an outline trace of the marking 198 past the sensing apparatus, so that the outline of the pattern may be detected, and reproduced by the punching members in the punching-marking-portion A, as both the template and the fabric web are indexed together through the machine.

As indicated in FIG. 9 the web 69 is to be cut along a circumferential line, or tracing 20 which line is a duplicate on the same or a greater or lesser scale of a similar outline of a pattern on the template 34 which is fed through the sensing portion B. The cut whereby a pattern is separated from the web is made by a series of punch-holes or perforations 21 which are made by reciprocating punching members actuated as the web 69 is advanced in steps below a plurality of vertical punch members 87 (FIG. 3) in the punching-marking-portion A. A marking 198 is applied to the pattern simultaneously with the cutting thereof, by the marker means in the punch portion A.

In the punching-marking-portion A a number of punches 87 are disposed according to a pattern, as to be explained in view of FIG. 10. A plurality of marking nozzles 187 are disposed according to a similar pattern at the punches 87, therefore, the layout is to be explained only using the punches 87 as an example. In the preferred embodiment, the punches are disposed in four successive rows A–D (FIG. 10) in the direction of the length of the web 69.

The lateral web direction is indicated by the arrow Q. The first punch a is shown disposed at the lefthand edge of the row A, while the subsequent punch b in the next row is disposed below the punch a, and slightly displaced in the lateral direction Q. The magnitude of the lateral displacement is indicated by x, which is a distance less than the diameter of the punch a, so that a corresponding overlapping distance m is provided. This overlapping distance is necessary to be able to accomplish a continuous cut as indicated by the overlapping punch holes in the cut 21 (FIG. 9). Subsequent punches c and d are disposed in subsequent rows C and D in a staggered relationship similar to the one explained above. Proceeding further in the lateral direction Q the punch disposed subsequent the punch d is a punch e which is located in the line A. An overlapping distance m is also provided between the punches d and e. In the case of marking nozzles 187, an actual overlapping of the nozzles themselves is not necessary if an overlapping marking pattern can be accomplished by a suitable nozzle design. The overlapping distance m in the present embodiment is of the order of 1 mm. when the punch diameter is in the order of 3 mm. Consequently, the lateral distance between the centers of two punches in adjacent rows is approximately 2 mm. The layout of the sensors adapted to contact the template 34 is substantially identical to the layout of the corresponding punches or the corresponding nozzles, except the actual distances may be on a different scale, as indicated.

The detector or sensor portion B includes electrically controlled means for actuating the reciprocation of the punches 87 and other similarly electrically controlled means for actuating material flow through the marking nozzles 187. A tracing is applied onto the template 34, the outline of the tracing corresponding to the outline of the pattern to be cut from the web 69. The purpose of the tracing is to generate an electrical signal in cooperation with the sensors to actuate respective punches 87. Similarly, a tracing corresponding to the desired outline of the marking 198 to be applied onto the pattern, is applied to the other side of the template 34. Sensors for controlling the actuating means for the nozzles 187 are adapted to contact the tracing on this opposite side of the template, for actuating the nozzle. The scanning or sensing portion B is shown on the righthand side in FIG. 1, and the punch-and-marking portion A is shown disposed in a laterally adjacent relationship thereto, therefore, the web 69 and the template 34 are indexed parallel to each other through the machine through their respective portions. The tracing on the template 34 does not have to be identical in size with the desired size of pattern as defined by the outline 20 in FIG. 9, but may be on the same or a smaller or larger scale. This scale relationship is correspondingly reflected by the disposition of the sensors and the corresponding punches 87 and marking nozzles 187. The web 69 may be a continuous strip of fabric comprising one or more layers, and the template may be endless or in the form of a strip to be indexed or moved stepwise through the sensing portion B in accordance with the movement of the web 69 through the punching-and-marking portion A.

In FIG. 1 a partially broken-away housing 22 is shown with a motor 23 connected by a magnetic clutch to a drive sprocket 26. A sprocket 28 connected to a shaft 29, a sprocket 27 to a shaft 99 and a sprocket 127 to a shaft 129 are all rotatably linked to the drive sprocket 26 by means of a chain drive 25. As to be explained in the following, the shaft 29 is provided for functioning as the drive shaft for the punching-and-marking portion A and the part of the sensing portion B containing the sensor means for actuating the punches 87. The punching-and-marking portion A is disposed between a pair of bearing support walls 31, 31, while the sensing portion B is disposed between a pair of bearing support walls 30, 30, maintained spaced from each other by cross-beams 32 and 132.

The parts of the sensing portion B are shown in detail in FIGS. 5–8, showing the path of the template 34 (FIG. 6) through the machine. Some smaller details of the sensing means, such as e.g. shown in FIG. 8, are illustrated only in view of the sensing means for the actuation of the punches 87, however, it is to be understood that the sensing means for the actuation of the marker nozzles 187 are similar in construction, and are designated by reference numerals generally higher by 100 than the reference numerals relating to the sensing means for the actuation of the punches.

A bedplate 33 is attached to the bearing supports 30, 30 serving as a base for the sensing means related to the punches 87 and disposed above the bedplate. Adjacent thereto, as shown in FIG. 6, and in a mirror-image relation is another bedplate 133 attached to the bearing supports 30, 30 to act as a support for the sensing means related to the marking nozzles 187. The template 34 is indexed along between the bedplates 33 and 133, the template entering the housing 22 past a curved guideplate 35, passing between a pair of opposing conveyor belts 36 and 37, passing through guide channels 38 and 39, and leaving the machine past a pair of belt conveyors 40 and 41, and finally over a curved guideplate 42. The template 34 may be a single strip, which does not have to be of the same size as the web 69, or in the alternative may also be an endless belt moving between the curved guideplates 35 and 42.

The scanning means, associated with the punches 87, disposed above the bedplate 33 includes members movable up and down along a vertical guidepost 43 against the action of a compression spring 44. The scanning means further includes three plates 45, 46 and 47 with spacers 48 and 49 arranged therebetween. All of these parts are held together by screws 50 and 51. A dowel pin 52 is provided to align the parts.

Mounted on the main shaft 29 is an eccentric or cam 53 which effects up and down movement of the scanning means associated with the punches 87. The eccentric cooperates with a headpiece 54 which is slidable on the scanning unit. A spring 44 serves for the return movement of the scanning unit and the cam 53 effects the downward movement thereof against the force of the spring 44.

The headpiece 54 is connected to the spaced 48 by screws 55. Plates 46 and 47 are provided with registering bores in which detector sleeves 57 are received (FIG. 8). The sleeves 57 are guided for up and down movement and are urged into their bottom end position by compression springs 58 which are fitted over strap rings 59 and abut against the bottom of the plate 45. A scanning pin or detector member 61 is guided for up and down movement within the sleeves 57 (see FIG. 8). The pin is tightly wrapped with insulating material 60. The compression spring 62 bears on the plate 45 and a washer or ring 63 on the sleeves 57 and urges the sleeves 57 into a lowermost position in the scanning unit B.

Figure 3:
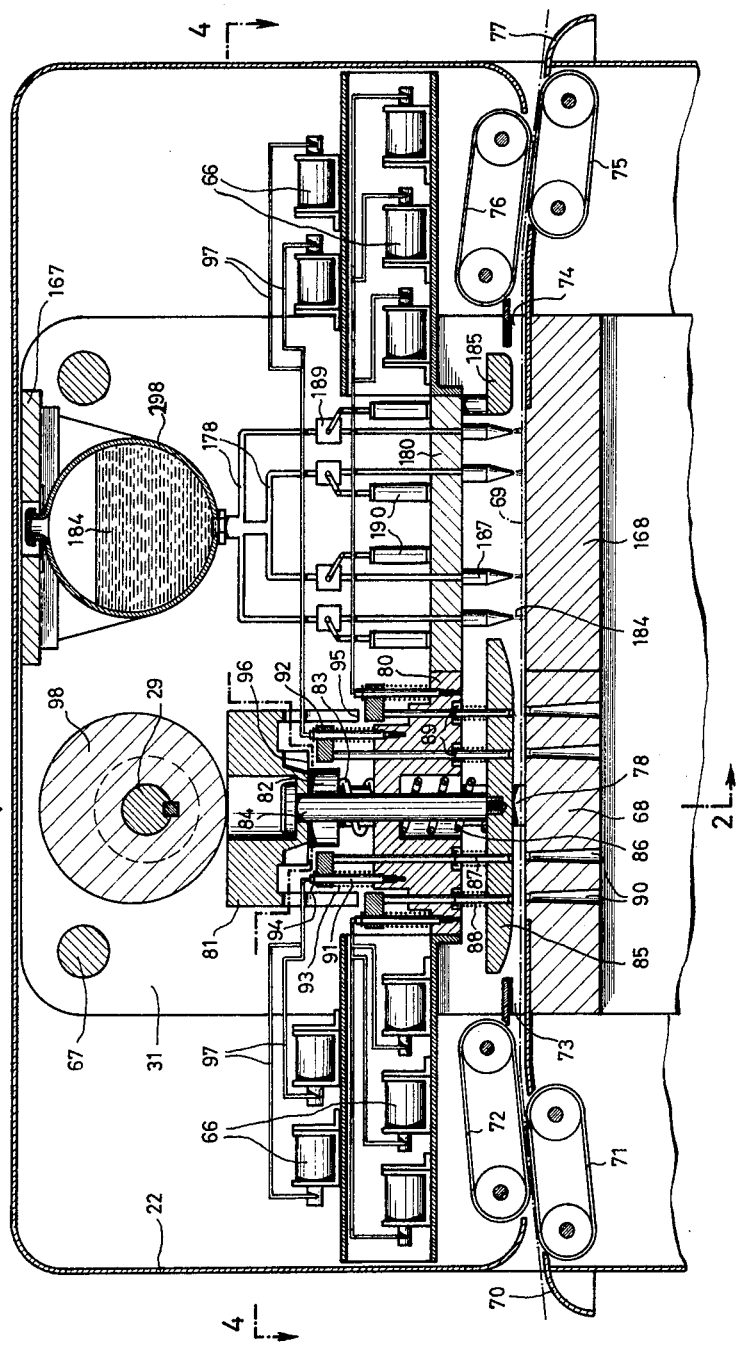
FIG. 3 is a transverse section of the punching and marking portions of the machine, taken along the line 3—3 of FIG. 2.

The sleeves 57 and the pins 61 are made of electrically conductive material and are connected to an amplifier 65 by means of conductors 64 (FIG. 6). Each pair of pins and sleeves are connected to a separate amplifier 65. Lines 79 extend from the amplifier 65 to a magnet 66 in the punching portion A of the machine (FIG. 3).

Mounted on the shaft 129 is an eccentric or cam 153, which similarly to the action of the eccentric or cam 53, as described above, effects the vertical reciprocation of the scanning unit associated with the marking nozzles 187. The eccentric 153 cooperates with the headpiece 154 which is slidable on the scanning unt. A spring 144 serves for the return movement of the scanning unit and the cam 153 effects the upward movement thereof against the force of the spring 144.

The headpiece 154 is connected to the spacer 148 by screws 155. Plates 146 and 147 are provided with registering bores in which detector sleeves 157 are received, similar in all respects to the showing of FIG. 8 with regard to the detector sleeves 57. Scanning pins or detector members 161 are guided for up-and-down movement with the sleeves 157, the pins being separated by insulating material from the sleeves. Respective compression springs 162 bear on the plate 145 and strap rings or washers 163 on the detector sleeves 157 and urge the sleeves towards an uppermost position towards the bed-plate 133.

The conductive sleeves 157 and the conductive pins 161 are each connected to respective amplifiers 165 by means of conductors 164.

When the template 34 which may be a paper, plastic or the like strip, is fed through the sensing portion B, the circular bottom faces of the cylindrical pins 61 and the annular bottom faces of the sleeves 57 are urged by the springs 58 and 62 onto one surface of the moving template. Similarly, the corresponding surface of the pins 161 and the sleeves 157 are urged against the other surface of the template 34. The tracings on each side of the template, to be detected by the respective sensing means may be made by pencil containing graphite or other conductive material, or by any other suitable condutcive marking media. The conductive tracing contacts the bottom faces of the correspondingly located sleeves 57 and the pins 61 of each pair comprising a pin and a sleeve, and a conductive connection is made between the parts of each pair. A similar connection is established between the sleeves 157 and the pins 161 upon contacting a conducting tracing on the opposite side of the template. The preferred annular and circular cross-sections of the sleeves and pins, respectively, provide advantageous contacting surfaces which insure that contact will be made by at least one point of these faces when the conductive tracing is therebeneath or thereabove. Each pair comprising a sleeve 57 and pin 61, or sleeve 157 and pin 161, respectively, is provided with a separate amplifier 65 or 165, each amplifier being connected by the leads 79 and 179, respectively, to a magnet 66 or an actuating member 190 in the punching marking portion of the machine.

Figure 2:
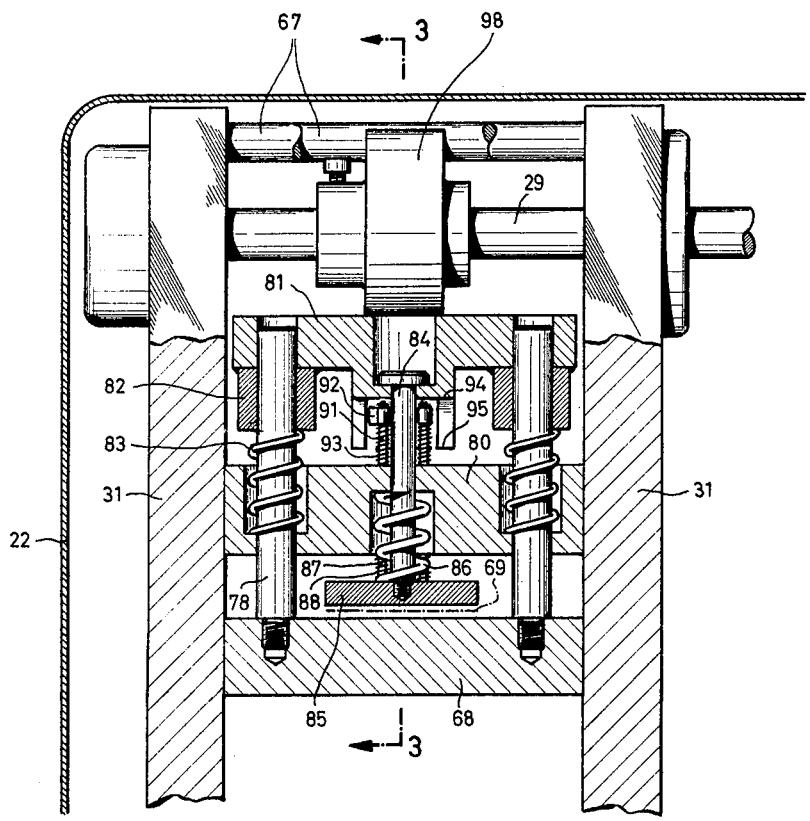
FIG. 2 is a longitudinal section on a somewhat larger scale of the punching portion of the machine, taken along the line 2—2 of FIG. 3.
Figure 4:
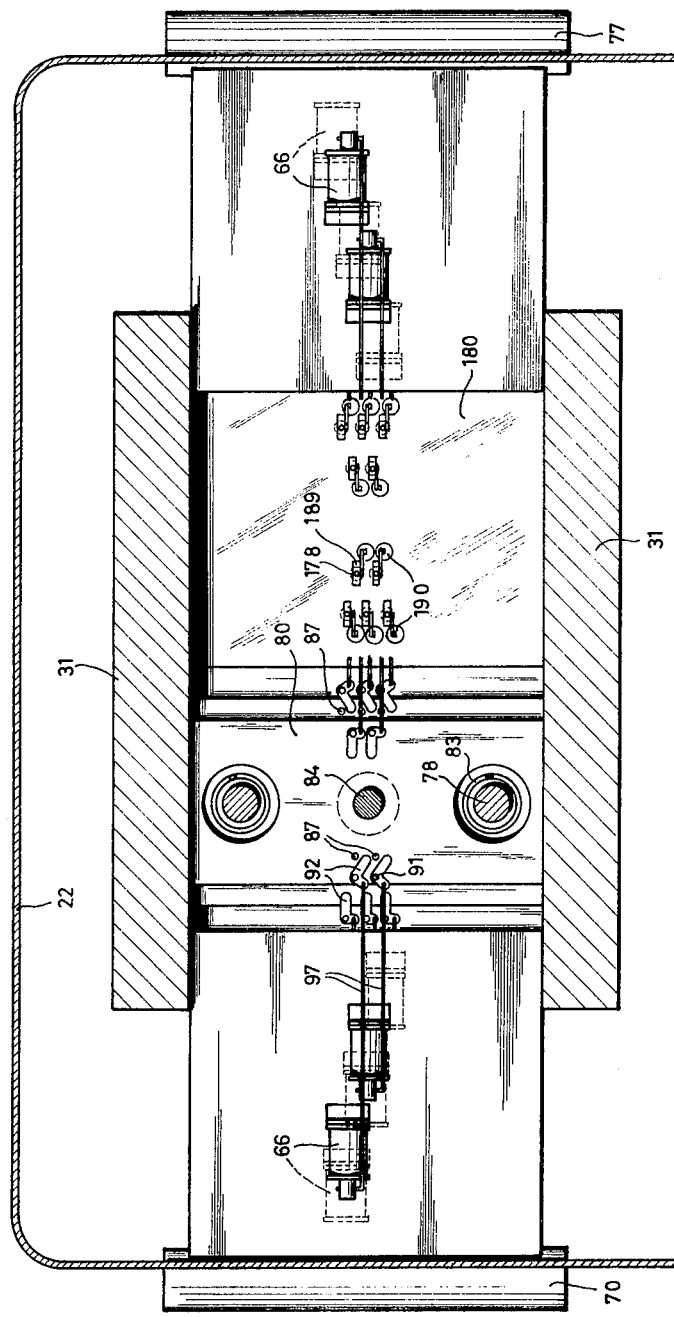
FIG. 4 is a horizontal transverse section, taken along the line 4—4 of FIG. 3.

The punching-and-marking portion A of the machine is shown in detail in FIGURES 2-4. As indicated above, the layout arrangement of the punches 87 is proportional to the layout of the associated sensors comprising pairs of detector sleeves 57 and pin 61; and the layout of the marking nozzles 187 is proportional to the layout of the associated sensing means comprising pairs of sleeves 157 and detector pins 161. The bearing supports 31, 31 are separated from each other by spacer cross-beams 67. A pair of bottom plates 68 and 168 mounted adjacent each other (FIG. 3) are supported between the bearing supports 31, 31 and serve as a lower guide or support for the web 69 during the punching procedure.

The web is conveyed through the punching and marking portion A of the machine by means which are similar to the means provided for the conveying of the template 34. As shown in FIG. 3, there is provided a curved guideplate 70, an inlet conveyor belt 71 cooperating with an oppositely disposed conveyor belt 72, guide channels 73 and 74, an exit conveyor comprising endless belts 75 and 76, and an outlet guide plate 77.

Above the bottom plate or matrix 68 spaced vertical guide bolts 78 are positioned for guiding a vertically reciprocable cross piece 81 which bears on compression springs 83, the other end of which is inserted into guide sleeves 82 of a bridge member designated 80. The bridge member in turn is screwed to and bolted in bearing supports 31, 31. A hold down plate 85 is mounted on a central bolt 84 (FIG. 2). The plate 85 is urged downwardly by compression spring 86 to a position at which the head of bolt 84 will lie against the bottom of a recess cut out for that purpose in cross piece 81. When the cross piece 81 is moved upwardly by the action of the springs 83, bolt 84 is lifted along with the hold down plate 85 and the web of material 69 is released. A multiplicity of punch members or punch rods 87 are arranged in a pattern corresponding to the detector pins 61 for reciprocating up and down movement. The punches 87 are urged into their upper end position (FIGS. 1 and 3) by compression springs 88 which bear at one end on the hold down plate 85 and on the opposite end on snap ring 89 of the punches 87.

Holes 90 are cut into the base plate 68 in positions underlying each of the punch pins 87. A bolt 91 is screwed into the bridge 80 adjacent each of the punches 87 and it holds a rotatable bridge piece 92 which is urged against an upper stop portion 94 of the bolt 91 by a spring 93. The piece 92 can be moved between two end positions, one end position in which it overlies an associated punch 87 at a location beneath a portion of the cross piece 81 and another end position at which it is out of vertical alignment with the associated punch 87 (FIG. 3) and overlying cross piece.

The cross piece 81 is provided with downwardly extending projections or portions 95 and 96 arranged in vertical alignment with a respective punch 87 and each has a length such that the piece 92 when it is in the inturned or operative position, is capable of pressing down on the associated punch 87 when the cross piece is reciprocated downwardly to its lowest position. The length of the projections 95 and 96 is also such that there will be no contact between the piece 92 and the punch 87 when it is in its turned outward inoperative position.

In accordance with the invention, the turning out or in of the piece 92 is done by the previously mentioned electromagnets 66 which are connected by rods or bars 97 to the piece 92 (see in particular FIG. 4).

The cross piece 81 is reciprocated under the control of a cam or eccentric 98 which is keyed to the main shaft 29. This results in the constant reciprocating movement of the cross piece 81.

The shaft 99 drives the conveyor mechanism by means of an indexing mechanism, such as a Geneva wheel for example, to transmit intermittent indexing movement to the endless conveyor belts 36, 37, 40, 41, 71, 72, 75 and 76 in order to provide completely synchronous intermittent drive of the template 34 on the one hand and the web 69 on the other hand, so that this structure forms a means for indexing the work material 69 and the template 34 together through the machine. The indexing mechanism may, of course, be interposed between sprocket 27 and shaft 99 so that the later is intermittently driven. The rate of advancement of the template 34 and the web 69 corresponds in the longitudinal direction to the distance of the axes of pins 61 and sleeves 57 and the punches 87, respectively, as measured in the direction of the length of the web or the template as indicated in FIG. 10 from one row to a subsequent row.

The baseplate 168 is mounted between the bearing supports 30, 30 adjacent to the baseplate 68, the marking nozzles 187 being disposed above the baseplate 168. An auxiliary hold-down plate 185 is provided, coupled to the reciprocation movement of the hold-down plate 85, to provide additional facilities for the holding down of the web 69 in the area of the spraying nozzles 187. A bridge member 180 is mounted adjacent the bridge member 80, the bridge member 180 mounting the marking spray-nozzles 187 on the bottom side thereof. A liquid or powder spraying medium 184 is disposed in a container 298 mounted by a carrying plate 167 from the bearing supports 31, 31.

Conduits 178 connect the container 298 through valves 189 to the marking nozzles 187. Electrically actuable valve control members 190 are provided for each valve 189 in each conduit 178. The valve actuating members 190 are controlled in a manner similar to the control of the punch actuators 66, but in this instance actuated by the sensing unit comprising pairs of detector sleeves 157 and detector pins 161, through their respective amplifiers 165, whereby upon the transmission from a signal from respective amplifiers 165, respective valve-actuating members 190 allow the flow of a certain amount of marking medium 184 through corresponding marking nozzles 187.

In operation the motor 23 drives the shaft 29 continuously, and the shaft 99 rotates intermittently, or it drives the conveyor mechanism intermittently, as indicated. The eccentric cams 53, 153 and 98 reciprocate the sensing and stamping means at the same speed. The upper face of the bedplate 33 and the lower face of the bedplate 133 may be made of, or coated with a non-conductive material, so as to avoid the establishment of electrical contact between the detector sleeves 57 and detector pins 61, and sleeves 157 and pins 161, respectively when the templplate 34 is not fully in the machine. When a template 34 is introduced over the guideplate 35 and a web of material 69 is introduced over the guideplate 70, the template is indexed along by the conveyors 36 and 37, while the web is indexed along in a proportionate manner by the conveyors 71 and 72. As the template 34 arrives to the other end of the machine, its indexing movement is supplemented by the conveyors 40 and 41, similarly, when the web 69 reaches the other end of the machine, its movement is supplemented by the conveyors 75 and 76.

With each complete rotation of the shaft 29 one indexing movement is completed, as indicated in FIG. 11 by the phase I. During the phase II the template 34 and the web 69 come to a rest and the sensor means comprising the sleeves 57 and 157 and the pins 61 and 161 are lowered and raised, respectively onto the template. At this moment there is no potential on the pins as yet. The electricity is switched onto the sensing means in phase III. As a pair of sensors 57, 61 and 157, 161, respectively contact a conductive tracing on the respective sides of the template 34, an electrical contact is established between a sleeve 57 or 157 and its respective pin 61 or 161, whereby in phase III a corresponding magnet 66 and a corresponding marker actuator means 190 becomes energized.

As a result of the energizing of the magnets and marker actuating means, a corresponding punching operation occurs by the punches 87 and the energized marker actuating means open the valves 189 of corresponding marking nozzles 187. The result of this operation is that corresponding to the depressed punches 87 a hole or holes are formed during phse IV in the web 69 and a marking or markings are sprayed onto the web. As the punches reach their foremost position during the phase V the electricity is turned off the sensors. Subsequently, during phase VI the sensors and punching means are returned to their upper positions. As the sensors are de-energized, the valves 189 close whereby the flow of the marking medium through nozzles 187 is terminated.

The reciprocation of the sensors is accomplished during the phases II—VI and the reciprocation of the punch members 87 is accomplished during the phases IV—VI, while all six phases alltogether correspond to one complete rotation of the shaft 29.

By means of the proportionally identical arrangement of the sensing means 57, 61 with the punches 87, and the sensing means 157, 161 and the marking nozzles 187, as the templates 34 indexes along the machine, in the web 69 a series of overlapping holes are punched corresponding proportionally to the outline of the tracing on the template 34, while the marking applied to the web 69 corresponds to the outline of the tracing on the opposite side of the template 34. By means of the cut 21 in the web 69 a pattern is separated from the web, the outline of the pattern corresponding to the tracing on the top side of the template 34, while the marking 198 on the pattern corresponds to the outline of the marking on the bottom side of the template 34.

It will be seen, therefore, that with the structure of the invention the plates 33 and 133 respectively form a pair of support means which support the templet 34 during its movement through the machine, while on the other hand, the plates 68 and 168 (FIG. 3) form a support means which supports the sheet of work material 69 during movement of the latter through the machine, and of course the sheet 69 and the templet 34 advanced together through the machine. A cutting means, formed by the assembly of punches, is situated adjacent to the plate 68 for cutting the sheet 69, while a marking means, formed by the nozzles 187, is located over the plate 168 of the support means for the sheet 69 for marking the sheet 69 in the manner described above. A first sensing means, formed by elements 57 and 61, senses the indicia on the templet 34 corresponding to the outline of the desired piece which is to be cut from the sheet 69, and this first sensing means is operatively connected with the cutting means for actuating the latter to cut from the work sheet a piece having a configuration in accordance with the indicia sensed by this first sensing means. The elements 157 and 161 form a second sensing means cooperating with the support 133 for sensing the indicia corresponding to the marks such as the mark 198 of FIG. 9, and this second sensing means is operatively connected with the marking means, formed by the nozzles 187, for actuating the latter to mark the sheet 69 in accordance with the predetermined location of the indicia sensed by the second sensing means 157, 161.

It will be seen that with the structure of the invention the indicia which is sensed by the sensing means 157, 161 passes between the plate 33 and the sensing means 57, 61, while the indicia which actuates this sensing means 57, 61 passes between the plate 133 and the sensing means 157, 161. However, in accordance with the present invention a means is provided to prevent the sensing means 57, 61 from responding to the indicia which is intended to be sensed by the sensing means 157, 161 as well as to prevent the latter sensing means from responding to the indicia which is intended for the sensing means 57, 61, and in the illustrated example this means takes the form of the templet 34 itself which by having these indicia situated on its opposite faces separates the different sets of indicia from each other, and of course due to the fact that the templet 34 is not electrically conductive the two sets of indicia are electrically insulated from each other. Through this expedient, the pair of distinct sensing means will be capable of responding only to the pair of distinct sets of indicia respectively intended therefor. In this way it is possible to direct the set of indicia intended for one of the sensing means through the space between the support and sensing means which is intended to respond to the other of the sets of indicia. Therefore, there is a considerable saving in space since it is not necessary, for example, to provide a templet 34 twice as wide as that which is provided with the invention so as to be able to carry a second set of indicia located beside the first set of indicia. Thus, the dimensions of the machine can be kept at a minimum and the accuracy of the location of the pair of sets of indicia with respect to each other is far greater since the marking indicia can be positioned directly with respect to the cutting indicia. It is unnecessary to duplicate the cutting indicia. Inaccuracies inherent in the latter type of arrangement are avoided with the structure of the invention through the expedient of directing each set of indicia past both of the sensing means, while providing a means which will guarantee that the sensing means for actuating the cutters will respond only to the indicia which provides the outline of the piece to be cut from the sheet 69 and the sensing means intended to control the marking means will respond only to the indicia which indicates where the marks are to be provided on the pieces which are cut from the fabric 69.

It is to be understood that the invention was described and illustrated by way of example as an improvement to a given textile cutting machine, therefore, the full scope of the invention is to be interpreted from the appended claims.

What is claimed is:
1. In a machine for marking and cutting from a sheet of work material, a piece of a given configuration, first and second support means located along a path of movement of a template through the machine for supporting the template while it moves through the machine, third support means for supporting a sheet of work material during movement of the latter through the machine, means for indexing the work material and template together through the machine, cutting means and marking means both located adjacent said third support means for respectively cutting a piece from the work material and marking the piece, first sensing means located adjacent and directed toward said first support means for cooperating therewith to sense, as the template moves between said first support means and first sensing means, a first set of indicia carried by the template, said first sensing means being operatively connected to said cutting means for actuating the latter to cut from the sheet a piece having a configuration corresponding to said first set of indicia sensed by said first sensing means, second sensing means located adjacent and directed toward said second support means for cooperating with the latter to sense, as the template moves between said second support means and second sensing means, a second set of indicia carried by the template, said second sensing means being operatively connected to said marking means for actuating the latter to mark the sheet of work material according to the second set of indicia, said first set of indicia passing with said template between said second support means and second sensing means and said second set of indicia passing with said template between said first support means and first sensing means, and means cooperating with said sets of indicia for rendering said first sensing means responsive only to said first set of indicia and said second sensing means responsive only to said second set of indicia.

2. In a machine as recited in claim 1, said first and second sensing means both including sensing components which are of identical construction, and said second sensing means responding to said second set of indicia in the same way that said first sensing means responds to said first set of indicia.

3. In a machine as recited in claim 2, said indicia being electrically conductive and the template carrying the same being electrically non-conductive, and said first and second sensing means being electrical and responding to the electrically conductive sets of indicia for respectively actuating said cutting means and marking means.

4. In a machine as recited in claim 3, the template itself forming said means which renders said first sensing means responsive only to said first set of indicia and said second sensing means responsive only to said second set of indicia, said first and second sets of indicia being respectively situated on opposed faces of said template to be insulated from each other thereby, said first and second support means respectively engaging opposed faces of said template and said first and second sensing means being respectively directed in opposite directions for sensing the sets of indicia which are respectively situated on opposed faces of said template.

References Cited by the Examiner

UNITED STATES PATENTS

| 1,062,257 | 5/1913 | Scheuer | 118—37 X |
| 1,157,754 | 10/1915 | Benjamin | 118—37 X |
| 2,804,764 | 9/1957 | Runton | 118—11 X |
| 2,921,555 | 1/1960 | Schwartz | 118—308 |
| 3,021,999 | 2/1962 | Blanz | 234—87 |

CHARLES A. WILLMUTH, Primary Examiner.

RICHARD D. NEVIUS, Examiner.